J. E. CRIM AND H. E. BROWER.
GEAR PULLER.
APPLICATION FILED NOV. 6, 1919.
1,343,661.
Patented June 15, 1920.
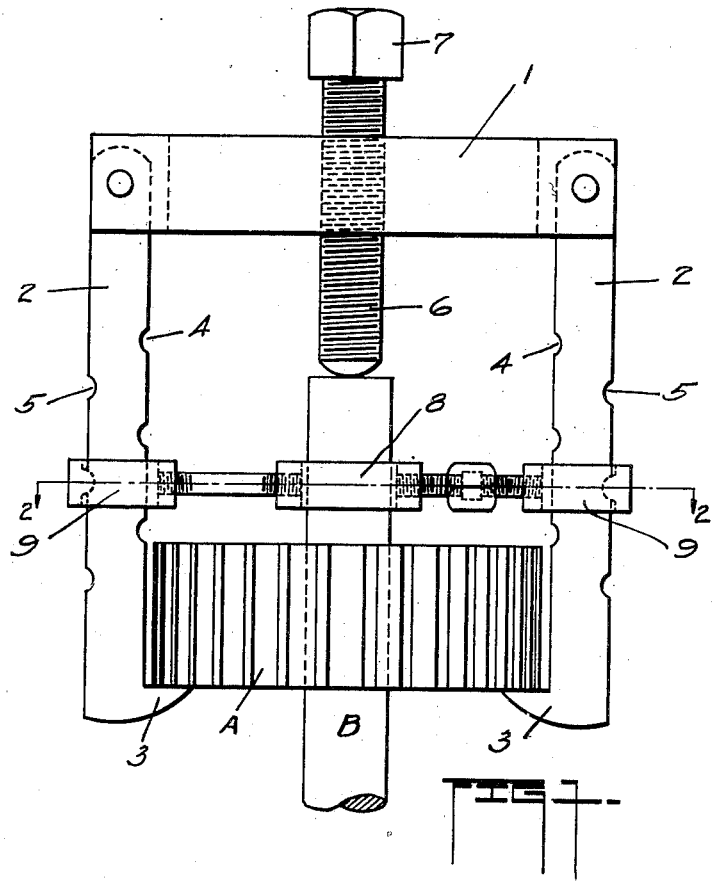
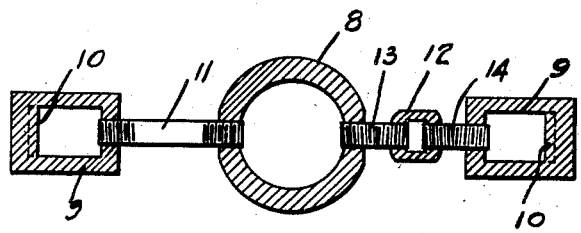
INVENTORS
Joseph E. Crim
Harry E. Brower
BY Charles LaPorte
ATTYS.

UNITED STATES PATENT OFFICE.

JOSEPH E. CRIM AND HARRY E. BROWER, OF DECATUR, ILLINOIS.

GEAR-PULLER.

1,343,661.

Specification of Letters Patent.

Patented June 15, 1920.

Application filed November 6, 1919. Serial No. 336,032.

*To all whom it may concern:*

Be it known that we, JOSEPH E. CRIM and HARRY E. BROWER, citizens of the United States, residents of Decatur, in the county of Macon and State of Illinois, have invented new and useful Improvements in Gear-Pullers, of which the following is a specification.

This invention has reference to a device for removing gear wheels from shafts, automobile wheels from axles, and like uses, and may be briefly referred to as a gear puller.

The invention has for its principal object, to provide a pilot lock for the gear puller so as to prevent sidewise movement of the device during the operation of moving a gear wheel from a shaft, or an automobile wheel from an axle.

The invention embodies principally, a pair of pivoted jaws designed to engage a wheel; a pilot ring designed to slip over the shaft, or axle, as the case may be, and the jaws and pilot ring connected by adjustable means, including members adapted to have a locking relation with the jaws.

That the invention may be fully understood, reference is had to the following drawings, in which:—

Figure 1 is a plan view of a gear puller embodying our invention, a gear wheel shown in the position when removing the same from its shaft, and Fig. 2 is a cross-section as the same would appear if taken on the line 2—2 of Fig. 1.

Like characters of reference denote corresponding parts throughout the figures.

The preferred embodiment of our invention includes a head or cross-beam 1, to the opposite ends of which are pivoted the jaws 2, 2. The free end of said jaws have hooked ends 3, and the opposite edges of said jaws are provided with spaced depressions or seats 4 and 5, respectively, which are preferably staggered in their relation to each other, as shown. Threaded through the head or cross-beam 1, is the screw 6 having the preferably squared head 7 to be engaged by a suitable tool for manipulating said screw.

8 designates a pilot ring which, when in use, is in axial alinement with the screw 6, as shown in Fig. 1. Coöperating with said pilot ring are a pair of collars 9, 9 slidable on the jaws 2, and each provided with an internal fillet or knob 10, adapted to be seated in a depression or seat 4 or 5, when coincident therewith, depending, of course, on which of the depressions or seats are presented outwardly. To one collar 9 and the pilot ring 8, is connected a short stud or stem 11, and preferably having a threaded connection with each said collar and pilot ring. The other collar 9 and said pilot ring 8 are preferably connected by a turn-buckle 12, and stems or studs 13 and 14, which have threaded connections, respectively, with said pilot ring and turn-buckle, and said collar and turn-buckle.

In operation, and when it is desired to remove a gear wheel (A) from a shaft (B), the stud or stem 11 and the turn-buckle 12 are loosened to allow the jaws 2 to embrace the gear wheel in the manner shown, the hooked ends 3 of said jaws bearing against the face of the wheel, and the shaft inserted through the pilot ring 8, its end abutting against the end of the screw 6. Tightening up the stud or stem 11 and the turn-buckle 12 will draw the jaws toward each other and seat the knobs 10 of the collars in depressions 5. The pilot ring 8, as will be understood, centers the device and prevents sidewise motion when the screw 6 is manipulated. Such an operation will pull the hooked ends 3 of the jaws forward and result in the gear wheel being removed from the shaft.

It is, of course, understood that when a press fit is made between a shaft and gear wheel, it is with some difficulty that the gear wheel may be removed. With a device such as we illustrate, the removal of the gear wheel is made comparatively easy, and the device could be used for pressing a shaft into a gear wheel, if desired.

We have constructed the jaws 2 with the depressions or seats 4 and 5 so as to provide for their use, as shown in Fig. 1, or when swung up and back, as may be sometimes necessary, because of the peculiar construction of the gear wheel.

It is of course understood that the jaws may be of any desired length and the pilot ring constructed in sizes to slide over shafts of different diameters.

What we claim is:

1. A gear puller including a pair of pivoted jaws, a pilot ring, collars slidable on said jaws, and adjustable connections between said collars and said pilot ring.

2. A gear puller including a pair of pivoted jaws; each having spaced depressions along one edge, collars slidable on said jaws and having knobs adapted to be seated in said depressions, a pilot ring, and adjustable connections between said collars and said pilot ring.

3. A gear puller including a pair of pivoted jaws, each having a hooked end and with spaced depressions on their inner and outer edges, a collar slidable on each jaw and having an internally arranged knob, adapted to be seated in a depression in a jaw, a pilot ring and adjustable connections between said collar and said pilot ring.

4. A gear puller including a pair of pivoted jaws provided with a plurality of depressions, a collar slidable on each jaw and having a knob adapted to be seated in a depression in said jaws, a pilot ring, a stem having a threaded connection with said pilot-ring and one of said collars, a turn-buckle, and a pair of stems having a threaded connection, respectively, with said pilot-ring and said turn-buckle, and with said turn-buckle and the other of said collars.

5. A gear puller including a head, a pair of jaws pivoted to said head and adapted to be held in parallel spaced relation, a screw having a threaded connection through said head, a pilot ring, and adjustable connections between said pilot ring and said jaws for positioning said pilot ring in axial alinement with said screen, and for maintaining such position of said pilot ring.

In witness whereof we have hereunto affixed our hands this 1st day of November, 1919.

JOSEPH E. CRIM.
HARRY E. BROWER.